UNITED STATES PATENT OFFICE.

HENRY HECKEL, OF CINCINNATI, OHIO.

ART OF MAKING SOAP FROM FATS AND OILS.

SPECIFICATION forming part of Letters Patent No. 273,075, dated February 27, 1883.

Application filed February 6, 1883. (No specimens.)

*To all whom it may concern:*

Be it known that I, HENRY HECKEL, a citizen of the United States, residing at Cincinnati, in the county of Hamilton and State of Ohio, have invented certain new and useful Improvements in the Art of Making Soap from Fats and Oils; and I do hereby declare the following to be a full, clear, and exact description of the invention, such as will enable others skilled in the art to which it appertains to make and use the same.

Prior to the date of my invention soap-making has been universally practiced by boiling fats or oils in their neutral condition in an alkaline solution, so that the decomposition and saponification proceeded together. My improvement consists in performing these two operations successively—that is to say, in first decomposing the fats or oils, so as to remove the glycerine, and then boiling the residual stock of fat acids in an alkaline solution to saponify them.

My invention may be practiced in various ways, according as it is desired to waste or save the glycerine. Thus the fats or oils may be first decomposed to obtain the fat acids by the well-known sulphuric-acid distillation process, and the fat acids subsequently boiled in an alkaline solution. While this is one way of carrying my invention into effect, I do not recommend it, because by said distillation the glycerine is destroyed or lost, and there are other objections to this process. Since the glycerine is very valuable, I recommend the use of a process of decomposition whereby that product can be saved. To this end the well-known steam-distillation process of decomposing fats or oils may be used, whether lime or other substances are used in connection therewith or not, care being taken to purify the decomposed fatty acids before saponification in case lime or any other chemical was used in the process of decomposition.

I do not confine myself to any particular process of decomposing the fats or oils. At the same time this patent is not intended to cover the specific form of my invention described in my United States Letters Patent No. 255,505, and set forth in the first claim thereof.

After the decomposition of the fats or oils has been effected, I proceed as follows: If the saponification is to be effected in the ordinary iron kettle now generally used by soap-makers for that purpose, the alkaline solution should be first introduced into the kettle and started aboiling, and then the fatty acids gradually added, preferably by showering them into the boiling alkaline solution by means of a sieve or a trough provided with numerous perforations. If the fat acids were first introduced into the iron kettle, not only would the latter be attacked and injured thereby, but the color of the soap would be darkened as a result of such attack. Hence it is desirable to saponify the fat acids before contact with the iron kettle, and that may be easily effected by proceeding as above directed. The showering of the fat acids into the alkaline solution is not essential, but will be found advantageous in that it insures a smooth saponification, and thus prevents lumpiness.

Having thus described my invention, what I claim is—

The improvement of the art of making soap from fats or oils, which consists of first removing the glycerine from such fats or oils, and then saponifying the residual stock, substantially as before set forth.

In testimony whereof I affix my signature in presence of two witnesses.

HENRY HECKEL.

Witnesses:
WM. L. GORDON,
B. E. J. EILS.